United States Patent [19]

Cornelius, deceased et al.

[11] 4,248,335

[45] Feb. 3, 1981

[54] KEY-OPERATED ACTUATOR

[75] Inventors: Richard T. Cornelius, deceased, late of Minnetonka, Minn.; Richard G. Lareau, executor, St. Paul, Minn.

[73] Assignee: McQuay-Perfex Inc., Minneapolis, Minn.

[21] Appl. No.: 6,344

[22] Filed: Jan. 25, 1979

[51] Int. Cl.³ .................................................. G07F 7/02
[52] U.S. Cl. .................................... 194/4 D; 222/153
[58] Field of Search .................. 194/4 B, 4 C, 4 D, 5, 194/4 R, 4 E, 4 F, 4 G; 222/153; 70/410, 422

[56] References Cited
U.S. PATENT DOCUMENTS 3,685,625   8/1972   Loewy ....................................... 194/4

Primary Examiner—Stanley H. Tollberg
Attorney, Agent, or Firm—Hill, Van Santen, Steadman, Chiara & Simpson

[57] ABSTRACT

A key-operated actuator includes a frame, an elongated bolt having a driving connection to the device to be actuated, a tumbler mechanism which enables bolt rotation only when a key having proper configuration is inserted. A frangible portion on the key axially displaces a non-rotatable sleeve which carries an anvil that breaks off the endmost frangible portion of the key. The driving connection between the bolt and the device to be actuated is at all times maintained, and the bolt is restricted to angular movement of a predetermined magnitude, there also being anti-backup means to ensure full bolt movement in both directions. A control disc is secured to the bolt and provides a portion of the anti-backup means, provides a portion of angular movement limiting means, provides an abutment that prevents bolt rotation when the last frangible portion has been broken off, and provides control for a further actuator that operates a further device.

19 Claims, 7 Drawing Figures

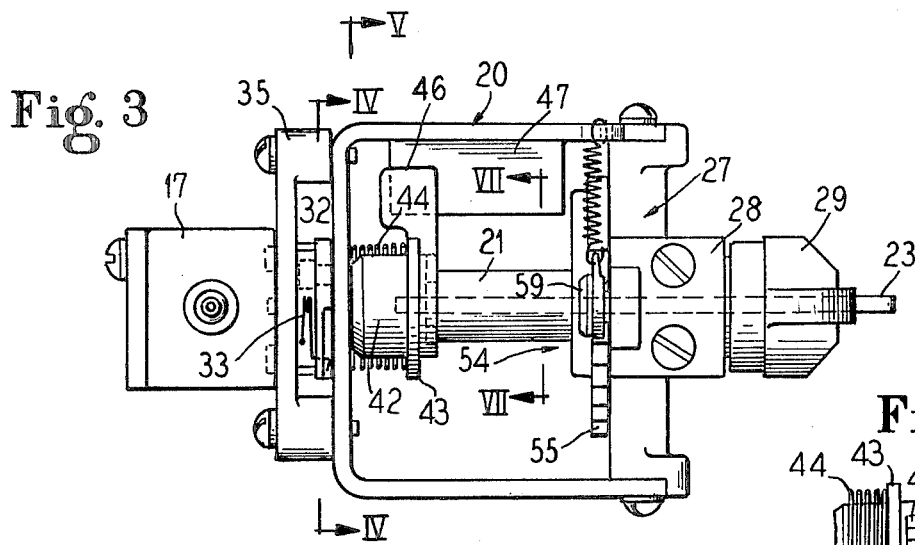
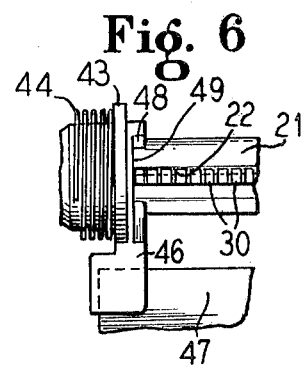
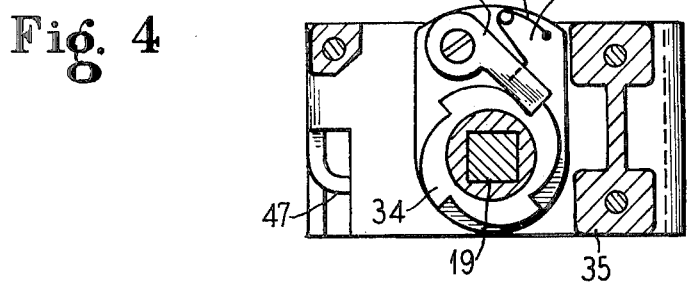
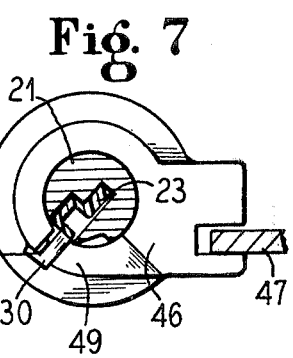
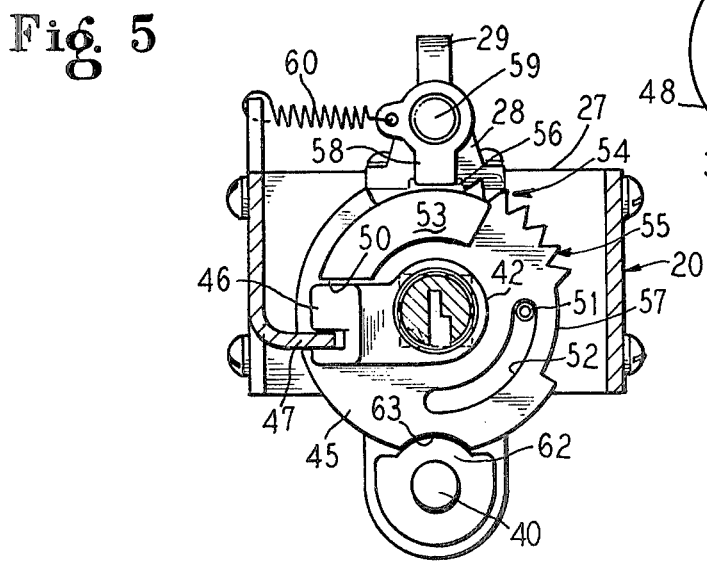

KEY-OPERATED ACTUATOR

BACKGROUND OF THE INVENTION

1. Field of the Invention

This invention pertains to a key-operated actuator for controlling a device or devices.

2. Prior Art

U.S. Pat. No. 3,685,625 discloses a key-actuated actuator. The device of this patent has a pin and slot used as a lost motion connection (for an unstated purpose) and a disconnectable drive connection between a rotatable sleeve and a device to be rotated. This device on clockwise rotation, as viewed by the person inserting the key, can be rotated continuously, with one tooth or frangible portion being knocked off the key per revolution. This device on counterclockwise rotation can be rotated continuously, the end tooth merely camming the anvil (16) away. With this device when there are no longer any teeth present on the key, the key can still be used to rotate the actuator freely in both directions, but without driving the device to be rotated. If the pin (10) thereof is not left "floating" in alignment with the slot, then when the next actuation with a useful key is attempted, this device will jam.

SUMMARY OF THE INVENTION

The present invention includes various features and advantages that overcome the foregoing problems. With the disclosed device the mechanism or actuator cannot be rotated continuously in either direction but must be returned to the starting position by movement in the opposite direction from the end position. With the present structure, even if there are no frangible portions or teeth present on the key, the actuator still cannot be rotated in either direction and the drive connection is at no time disconnected as is the case for the prior device.

Accordingly, it is an object of the present invention to provide a key-operated actuator for a vending or dispensing machine wherein a key having a number of frangible portions is used in place of a corresponding number of correct coin deposits in a coin mechanism, whereby the need for a coin mechanism, a coin tester or rejector, a coin changer, and a coin box are all eliminated, such elimination also making theft of coinage from the machine impossible and also greatly reducing the cost of such machine.

A further object of the present invention is to provide a key-operated actuator wherein the drive connection to the device is maintained at all times and conditions.

A further object of the present invention is to eliminate any possibility that the mechanism or actuator could be continuously rotated in either direction.

Many other features of the present invention will become manifest to those versed in the art upon making reference to detailed description and the accompanying sheets of drawings in which a preferred structural embodiment incorporating the principles of the present invention is shown by way of illustrative example.

ON THE DRAWINGS

FIG. 1 schematically illustrates a beverage dispensing system with which the actuator of the present invention can be advantageously used;

FIG. 3 is a bottom view of the actuator of FIG. 2;

FIG. 4 is a transverse vertical cross-sectional view taken along line IV—IV of FIG. 3;

FIG. 5 is a vertical cross-sectional view taken along line V—V of FIG. 3;

FIG. 6 is a fragmentary view of structure shown from below in FIG. 3 but viewed from above; and FIG. 7 is a fragmentary cross-sectional view taken along line VII—VII of FIG. 3.

AS SHOWN ON THE DRAWINGS

Figure 1:
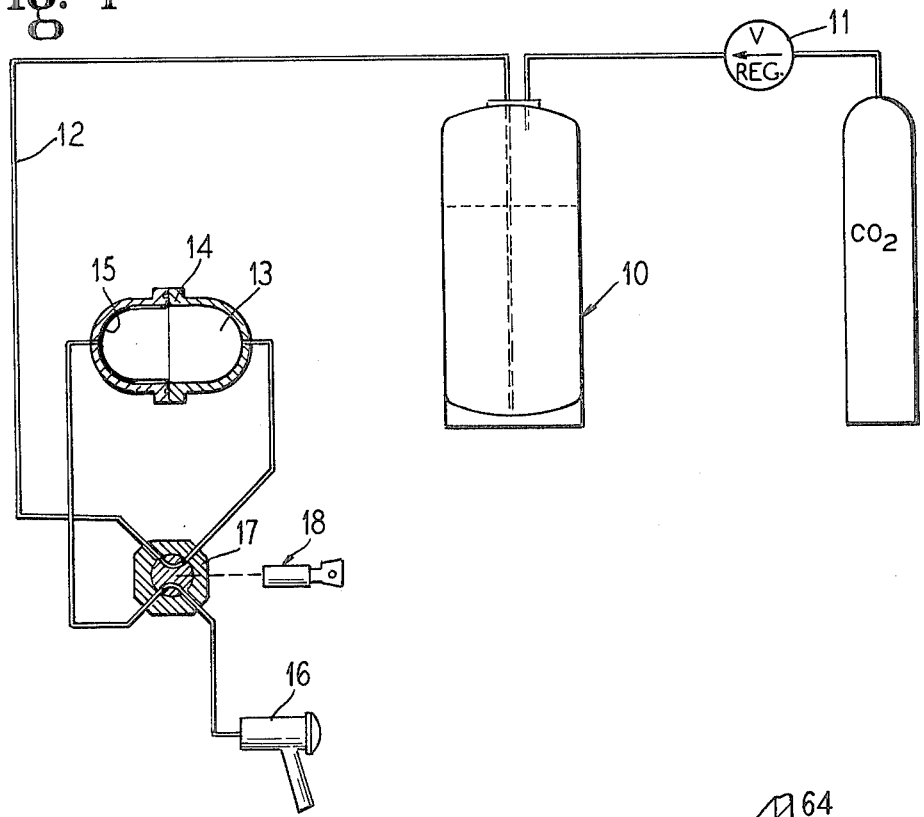

FIG. 1 shows a system with which the actuator of the present invention can be used to advantage. A tank 10 contains a supply of beverage which is pressurized with carbon dioxide gas by a pressure regulator valve 11 to force the beverage through a discharge line 12 to fill a chamber 13 of a metering device 14 that contains a reversible diaphragm 15. Beverage on the opposite side of the diaphragm is thus forced to move or flow to a dispensing valve 16. A 4-way valve 17 is a 4-position valve that controls the direction of beverage flow into and out of the metering device 14.

Figure 2:
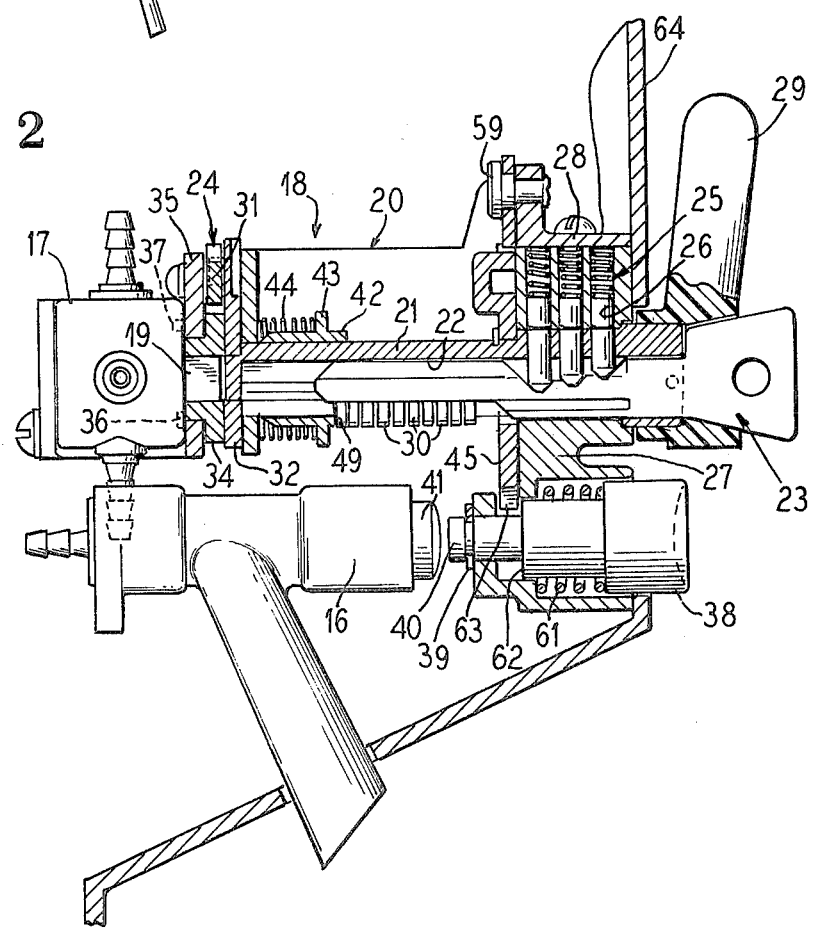
FIG. 2 is a vertical cross-sectional view, partly in elevation, of an actuator provided in accordance with the present invention.

In a preferred embodiment, an actuator shown schematically at 18 in FIG. 1 controls both the 4-way valve 17 and the dispensing valve 16, the actuator 18 being shown in detail in FIG. 2. The device 17 has a stem 19 which can be rotated to select the position of the 4-way valve 17, and such rotation is effected by and controlled by the actuator 18. The device 16 is a dispensing valve that has an axially slidable stem, and as such is actuatable by a push button.

The actuator 18 includes a frame 20 within which there is an elongated bolt 21 supported on the frame for angular movement. The bolt 21 has an elongated key slot 22 receptive of a key 23 from one end of the bolt 21, while actuating means 24 can be driven by the other end of the bolt 21 to actuate the device or valve 17. A tumbler mechanism generally indicated at 25 is carried on the frame 20 and has a set of tumblers, pins and springs that ride in the bores 26 of the frame, the tumblers projecting into the key slot 22 for cooperation with an appropriate profile on the key 23. In the absence of any key, pins span the interface between the frame 20 and the bolt 21 to prevent any angular movement of the bolt, the pins being retractable from the key slot 22 by a suitable amount to enable angular movement when a key having an appropriate profile is present.

As best seen in FIG. 3, the frame 20 is a generally U-shaped member which supports an end of the bolt 21 for angular movement. The frame further includes a block member 27 which interconnects the ends of the U-shape and which supports an end of the bolt 21. The block member 27 has the bores 26 that support the tumbler mechanism 25. The bores 26 are closed by a cover member 28 secured to the block member 27. A manual lever 29 is corotatably secured to the outer end of the bolt 21 so that turning forces may be applied thereto that otherwise might be either inconvenient to apply to the key 23 or which might damage the key 23. The key 23 has a number of frangible portions 30 which project radially outwardly of the bolt 21 through the key slot 22. This relationship is well illustrated in FIG. 7.

The actuating means 24 is driven by an end of the bolt 21 to actuate the device or valve 17. To that end, there is a driven pawl 31 pivotally carried on a mounting piece 32 which is corotatably secured to the end of the bolt 21. The pawl 31 is biased by a spring 33 into engagement with a ratchet 34 which has a positive drive with the stem 19 of the device or valve 17. A bearing plate 35 is secured to the frame 20 and rotatably supports the pawl 34 as best seen in FIG. 2. In addition, the bearing plate 35 has appropriate index means 36, 37 which accurately locate the valve 17, the valve 17 being secured to the bearing plate 35. The actuating means 24 is so arranged that when the bolt is moved angularly from its key-receiving position, then the pawl 31 rides up the slope of the next tooth on the ratchet 34. As is explained below, this angular movement is on the order of 105° so that the pawl 31 will drop behind the next tooth of the ratchet 34. On return of the bolt to its original key-receiving position, the pawl 31 drivably engages the ratchet 34 to advance the position of the valve or device 17. The bearing plate 35 is a detachable part of the frame 20.

The frame 20 further supports a push button 38 which is spring biased to an outer position and which is retained in a bore in the frame 20 by means of a snap ring 39 carried on an inner plunger portion 40 thereof which is engageable with a slidable stem 41 of the article or valve 16. Also shown in FIG. 2 is a fragmentary portion of a housing 64 that comprises part of the beverage dispensing machine.

A tubular sleeve 42 is slidably carried on the bolt 21 and has a flange 43, there being a spring 44 of the helical coil compression type acting between the frame 20 and the sleeve flange 43. When no key is present, a spring 44 urges the sleeve 42 all the way to the right as viewed in FIG. 2 until it engages a control disc 45. However, on receipt of a key 23, the left-most frangible portion 30 engages the sleeve 42 and slides it to the left against the force of the spring 44, the extreme or ultimate position being illustrated in FIG. 2. An end of the spring 44 surrounds the sleeve 42 which thus also functions as a pilot for the spring 44. The sleeve 42 has a radially projecting portion 46 shown in FIGS. 3, 6 and 7 which engages the frame 20 to preclude sleeve rotation. More specifically, the radially projecting portion 46 is bifurcated as best shown in FIG. 7 and engages opposite sides of a flange 47 forming a part of the frame 20 as best seen in FIG. 3. As best shown in FIG. 6, the sleeve 43 has an anvil surface 48 which defines one end of a recess having an axially directed or facing bottom 49 which engages the end of the innermost one of the frangible key portions 30. The anvil surface 48 is normally angularly displaced from the key slot 22. The recess is of such depth that only one of the frangible portions 30 of the key can be received at a time. As the sleeve 42 is kept from rotaton by the frame flange 47, when the bolt 21 is turned, then the endmost frangible portion 30 of the key 23 will engage the anvil 48 and be broken off.

As best shown in FIG. 5, the control disc 45 has an abutment 50. When the key 23 has only one frangible portion 30 remaining, it will displace the sleeve 42 toward the viewer in FIG. 5 so that the abutment 50 will pass in back of the radially projecting portion 46 of the sleeve 42. However, when no tooth is left, then the radially projecting portion 46 of the sleeve 42 is in the angular path of the abutment 50 to prevent any angular movement of the bolt, namely any rocking of the bolt. The control disc 45 and the frame 20 are provided with means to limit the angular movements of the bolt 21 in opposite directions. In this embodiment, as shown in FIG. 5, the angle limiting means comprises a pin 51 on the frame 20 and an arcuate slot or groove 52 on the control disc 45. The dimensions utilized in the illustrated embodiment enable the bolt to be moved angularly for a distance of 105°, thereby ensuring that the next tooth on the ratchet 34 will be engaged. Thus the angle limiting means also ensures more than 90 but under 180° of movement of the bolt 21 from its key-receiving position. As shown in FIG. 5, the control disc 45 also has an axially facing keeper surface 53 which extends from the abutment 50 along its angular path. When the last tooth or frangible portion 30 has been broken from the key 23, then the sleeve 42, and in particular the radially projecting portion 46 thereof, under the force of the spring 44, moves axially against the keeper surface 53 which thus prevents the sleeve from getting caught behind the abutment 50. The surface 53 thus holds the sleeve away from the principal surface of the control disc 45 until the bolt has been returned substantially to its key-receiving position.

As best seen in FIGS. 5 and 3, an anti-backup device 54 is provided on the frame 20 and the control disc 45. This device 54 prevents return of the bolt 21 after a frangible portion 30 has been broken from the key 23, and such return is prevented to ensure that the bolt 21 will be rotated sufficiently to enable the pawl 31 to engage the next tooth on the ratchet 34, thereby preventing return of the bolt to the key-receiving position except when a serving or vend has taken place. Thus full actuation of the actuator 18 is assured. The anti-backup device 54 is double acting in that it also acts during the return of the bolt 21 to the key-receiving position. In this embodiment, the anti-backup device 54 comprises a series of teeth 55 on the periphery of the control disc 45, disposed between a pair of peripheral recesses 56, 57. Further, a dog 58 is pivotally carried on a pin 59 supported on an upwardly extending arm on the cover 28. The dog 58 extends normally into the recess 56 in the angular path of the teeth 55, and when the bolt 21 has been moved angularly to its fully actuated position, the dog 58 extends into the recess 57. As viewed in FIG. 5, the teeth 55 cause the dog 58 to rock in a clockwise direction from the neutral position illustrated, and on return, the dog rocks in a counterclockwise direction from the position illustrated. A spring 60 biases the dog 58 to a neutral position so that during operation of the bolt in either direction, the dog is biased against the teeth 55. The neutral position is one that is directed toward the axis of the bolt 21.

The push button 38 has an internal shoulder against which a biasing spring 61 acts and a second internal shoulder 62 which is just offset from the control disc 45. The control disc 45 has a peripheral notch 63 through which the shoulder 62 of the push button 38 can pass, but only when the peripheral notch 63 is aligned therewith. Thus the push button 38 can be depressed only when the notch 63 is in registration with the push button 38, a condition that exists only when the bolt 21 is in the key-receiving position.

There are several states of operation, namely when there is no key, when a key is properly installed and has frangible portions 30 present, when a key is present and has only one frangible portion remaining, and when a key is present but has no frangible portion remaining. Operationally, each of these four states should be considered functionally for both bolt advancement and bolt return.

When there is no key present, the tumbler mechanism 35 will have its pins bridging the interface between the block member 27 of the frame 20 and the bolt and thus preclude any bolt movement in either direction. Under this condition, the valve 17 will connect one side of the metering device 14 to the dispensing valve 16 so that any fluid therein will be pressurized by the $CO_2$ supply. Under this condition, the peripheral notch 63 in the control disc 45 is in alignment with the push button 38 so that the button 38 can be depressed to actuate the dispensing valve 16. If the user desires, dispensing can be interrupted and resumed as often as is desired until the metering chamber then connected to the dispensing valve 16 is empty.

When a key 23 having two or more frangible portions 30 is inserted into the slot 22 in a fully inserted position as shown in FIG. 2, the profile of the key positions the tumbler mechanism 25 in a released position so that angular movement of the bolt 21 is not prevented. The innermost or endmost frangible portion 30 engages the sleeve 42 at the bottom of the axially facing recess 49 and the sleeve 42 is thus moved axially on the bolt 21 for whatever distance is necessary to enable full reception of the key 23. The bolt 21 and the key 23 can now be turned in a clockwise direction as viewed from the right in FIG. 2. The frame flange 47 holds the sleeve 42 against rotation, and thus the endmost frangible portion 30 is rotated against the anvil 48, and continued rotation breaks it off. Just before the endmost frangible portion 30 engages the anvil 48, the dog 58 passes over the first tooth 55 of the anti-backup device 54, thus preventing any return of the bolt to the key-receiving position until the angular movement of the bolt 21 has proceeded to the point where the pawl 31 has dropped behind the next tooth on the ratchet 34. During this movement, the next frangible portion 30 of the key clears the anvil 48 and engages the end of the sleeve outside of the recess 49 for the remainder of the advancing and retracting angular movement of the bolt 21. The advancing movement is limited by the engagement of the lower illustrated end of the slot 52 with the pin 51. The key 23 and the bolt 21 can now be moved angularly in the opposite direction, and doing so drives the ratchet 34 in a clockwise direction as shown in FIG. 4 to advance the device or valve 17 by one step, here 90°. The return movement is accompanied by corresponding action again of the anti-backup device 54 which prevents a reversal of direction of movement until substantially the moment when the upper illustrated end of the groove 52 engages the pin 51 as shown in FIG. 5. The dispensing valve or device 16 can now be manually actuated.

When the actuator is released using a key only having one frangible portion remaining, the operation is similar except that when the last portion 30 has been broken off, there is no further portion 30 to hold the sleeve 42 in place. So long as there is a remaining frangible portion 30 on the key 23, it will function to keep the radially extending portion 46 of the sleeve 42 axially spaced from the abutment 50, but when the last frangible portion 30 is gone, the spring 44 will urge the sleeve 42 against the control disc 45 that carries the abutment 50. Under this condition, the keeper surface 53 will be engaged by the radially projecting portion 46 of the sleeve 42 to permit the cycle to be completed, and on return of the bolt and control disc 45 substantially to the position shown in FIG. 5, the spring 44 will shift the sleeve 42 into engagement with the control disc 45 adjacent to the abutment 50.

If an attempt is made to operate the actuator with no teeth 30 present, then the abutment 50 would tend to move counterclockwise as viewed in FIG. 5 and immediately engage the radially projecting portion 46 of the sleeve 42 before the dog 58 of the anti-backup device could engage the first tooth 55.

A wide variety of cross-sectional configurations of keys may be provided for different installations, and each of these may be provided with a wide variety of key profiles and corresponding tumbler mechanisms, so that if a user has paid one business entity for his key 23, it is highly unlikely that such user would find some other business entity operating with this device that would both receive the key and align the tumbler mechanism. The key may be manufactured from general purpose styrene and as shown in FIG. 7, the frangible portion 30 has a relatively weak connection with the remainder of the key blank.

The push button 38 may be utilized to operate various types of devices, such as a switch connected in a circuit to control some other type of dispensing or vending. With such a substitution, the actuating means 24 could comprise a cam and switch assembly.

Although various minor modifications might be suggested by those versed in the art, it should be understood that all such embodiments as reasonably and properly come within the scope of the contribution to the art is embodied within the scope of the patent warranted hereon.

What is claimed is:

1. An acutator adapted to be operated by a key having at least one frangible portion, said actuator comprising:
 (a) a frame;
 (b) an elongated bolt supported on said frame for angular movement, said bolt having a key-slot therein receptive at one end of the key with its frangible portion projecting therefrom, its other end being adapted to actuate a device;
 (c) a tumbler mechanism on said frame and slidably projecting into said key slot in the absence of the key to prevent angular movement of said bolt, and retractible therefrom by the key;
 (d) an axially-biased sleeve slidable on said bolt in response to being engaged by the frangible portion of the key, said sleeve having a radially projecting portion engageable with said frame to preclude sleeve rotation, said sleeve having an anvil surface normally angularly displaced from the key-slot for breaking off the frangible portion of the key during angular movement of said bolt;
 (e) a control disc co-rotatably secured to said bolt; and
 (f) an abutment on said control disc engageable with said radially projecting portion of said angularly fixed sleeve to thereby prevent rocking of said bolt, said sleeve being displaceable out of the angular path of said abutment by the presence of at least one such frangible key portion on the key.

2. An actuator according to claim 1, including means on said control disc and said frame for limiting the extent of the angular movement of said bolt in opposite directions.

3. An actuator according to claim 1, said radially projecting portion of said sleeve being bifurcated and receptive of and engageable with opposite sides of a flange on said frame.

4. An actuator according to claim 1, said anvil surface bounding one end of an axially open recess on said sleeve, the bottom of which recess is engageable by the frangible portion of the key.

5. An actuator according to claim 1, including a helical spring having an end surrounding a portion of said sleeve and acting between a flange on said sleeve and said frame.

6. An actuator according to claim 1, including an anti-backup device carried on said frame and said control disc for preventing return of said bolt after breakoff of the frangible portion to ensure full actuation of the device.

7. An actuator according to claim 6, said anti-backup device of a being double-acting type acting also on return of said bolt.

8. An actuator according to claim 6, said anti-backup device comprising a series of teeth disposed on the periphery of said control disc, between a pair of peripheral recesses, and a dog pivoted on said frame and extending into the angular path of said teeth, and a spring biasing said dog to a central position from which it can be driven in either direction by said teeth.

9. An actuator according to claim 1, including a device to be actuated and means driven by said other end of said bolt for actuating said device.

10. An actuator according to claim 9, said actuating means comprising a driving pawl secured to said other end of said bolt, and a ratchet having a driving connection with said device and driven by said pawl during return movement of said bolt.

11. An actuator according to claim 10, said device being secured to said frame, and said ratchet being rotatably supported by said frame.

12. An actuator according to claim 9, said device being a rotary 4-position 4-way valve, and means for ensuring over 90° of rotation of said bolt away from its key-receiving position, but less than 180° of such rotation.

13. An actuator according to claim 1, including a manual lever secured to said bolt by which said bolt is moved angularly.

14. An actuator according to claim 1, there being an axially facing keeper surface on said control disc extending from said abutment along its angular path and engageable with said sleeve after the last frangible portion has been broken off, until the bolt has been returned substantially to its key-receiving position.

15. An article adapted to be actuated by a push button including an actuator according to claim 1, a push button slidably guided on said frame, and a peripheral notch in said control disc through which said push button may move, said notch being in registration with said push button when said bolt is in its key-receiving position.

16. An actuator according to claim 1, said frame comprising: a U-shaped member rotatably supporting said other end of said bolt, a block member interconnecting the ends of said U-shaped member and rotatably supporting said one end of said bolt and having bores in which said tumbler mechanism is supported, and a cover member secured to said block member and closing said bores.

17. An actuator according to claim 16, said cover member supporting a pin in overhanging relation to said control disc, a row of teeth on the periphery of said control disc, there being a recess in said periphery at both ends of said row, a dog pivoted on said pin and extending radially therefrom normally into one of said recesses, and a spring acting between said frame and said dog and biasing it into a position directed toward the axis of said bolt.

18. An actuator according to claim 16, said frame including a bearing plate overlying the closed end of said U-shaped member, a driving pawl corotatably secured to said other end of said bolt, a ratchet rotatably supported in said bearing plate and adapted to be drivably connected to a device, and disposed to be driven incrementally by said driving pawl.

19. An actuator according to claim 18, said bearing plate having means for supporting the device.

* * * * *